(12) United States Patent
Park et al.

(10) Patent No.: US 10,620,467 B2
(45) Date of Patent: Apr. 14, 2020

(54) LIQUID CRYSTAL DISPLAY PANEL

(71) Applicant: LG Display Co., Ltd., Seoul (KR)

(72) Inventors: Taejoon Park, Hwaseong-si (KR); Jeongwoo Jang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 8 days.

(21) Appl. No.: 15/818,554

(22) Filed: Nov. 20, 2017

(65) Prior Publication Data
US 2018/0149898 A1 May 31, 2018

(30) Foreign Application Priority Data
Nov. 25, 2016 (KR) .......................... 10-2016-0158007

(51) Int. Cl.
*G02F 1/1362* (2006.01)
*G02F 1/1343* (2006.01)
(Continued)

(52) U.S. Cl.
CPC ...... *G02F 1/13338* (2013.01); *G02F 1/13439* (2013.01); *G02F 1/133512* (2013.01); *G02F 1/134309* (2013.01); *G02F 1/134363* (2013.01); *G02F 1/136209* (2013.01); *G02F 1/136286* (2013.01); *G06F 3/044* (2013.01); *G06F 3/0412* (2013.01); *G06F 3/0416* (2013.01); *G02F 1/1368* (2013.01); *G02F 1/134336* (2013.01); *G02F 2001/13685* (2013.01); *G02F 2001/134318* (2013.01); *G02F 2001/134345* (2013.01); *G02F 2001/136218* (2013.01);
(Continued)

(58) Field of Classification Search
CPC ..... G02F 1/13338; G02F 2001/136218; G02F 1/134363; G02F 2001/134372
See application file for complete search history.

(56) References Cited

U.S. PATENT DOCUMENTS

2008/0284962 A1* 11/2008 Horiguchi ......... G02F 1/134363
349/139
2013/0240916 A1* 9/2013 Choi ..................... H01L 27/156
257/88
(Continued)

FOREIGN PATENT DOCUMENTS

KR 10-2014-0054739 A 5/2014
KR 10-2016-0072646 A 6/2016

*Primary Examiner* — Michael H Caley
*Assistant Examiner* — Mariam Qureshi
(74) *Attorney, Agent, or Firm* — Polsinelli PC

(57) ABSTRACT

A liquid crystal display (LCD) panel may include: a plurality of unit pixels arranged in a matrix shape in a display region, and each including two or more sub pixels corresponding to different colors and arranged in parallel to each other; a gate line of a first direction and a data line of a second direction which intersect each other; a shield pattern disposed on a first interlayer dielectric layer covering the gate line and the data line, and overlapping the data line; a plurality of first common electrode patterns and second common electrode patterns arranged on a second interlayer dielectric layer covering the shield pattern; and a block pattern corresponding to each of the first and second common electrode patterns, disposed in a boundary region between two or more sub pixels included in each of the unit pixels, and overlapping at least one of the gate line and the data line.

18 Claims, 14 Drawing Sheets

(51) Int. Cl.
*G02F 1/1333* (2006.01)
*G06F 3/044* (2006.01)
*G02F 1/1335* (2006.01)
*G06F 3/041* (2006.01)
*G02F 1/1368* (2006.01)

(52) U.S. Cl.
CPC .. *G02F 2201/121* (2013.01); *G02F 2201/122* (2013.01); *G02F 2202/16* (2013.01); *G02F 2203/01* (2013.01)

(56) References Cited

U.S. PATENT DOCUMENTS

| | | | |
|---|---|---|---|
| 2015/0192814 A1* | 7/2015 | Kosugi | G06F 3/0412 349/12 |
| 2015/0301381 A1* | 10/2015 | Okita | G02F 1/13338 349/12 |
| 2016/0291757 A1* | 10/2016 | Ding | G06F 3/0412 |
| 2017/0052418 A1* | 2/2017 | Zhang | G02F 1/136227 |
| 2017/0103247 A1* | 4/2017 | Mizuhashi | G06F 3/044 |

* cited by examiner

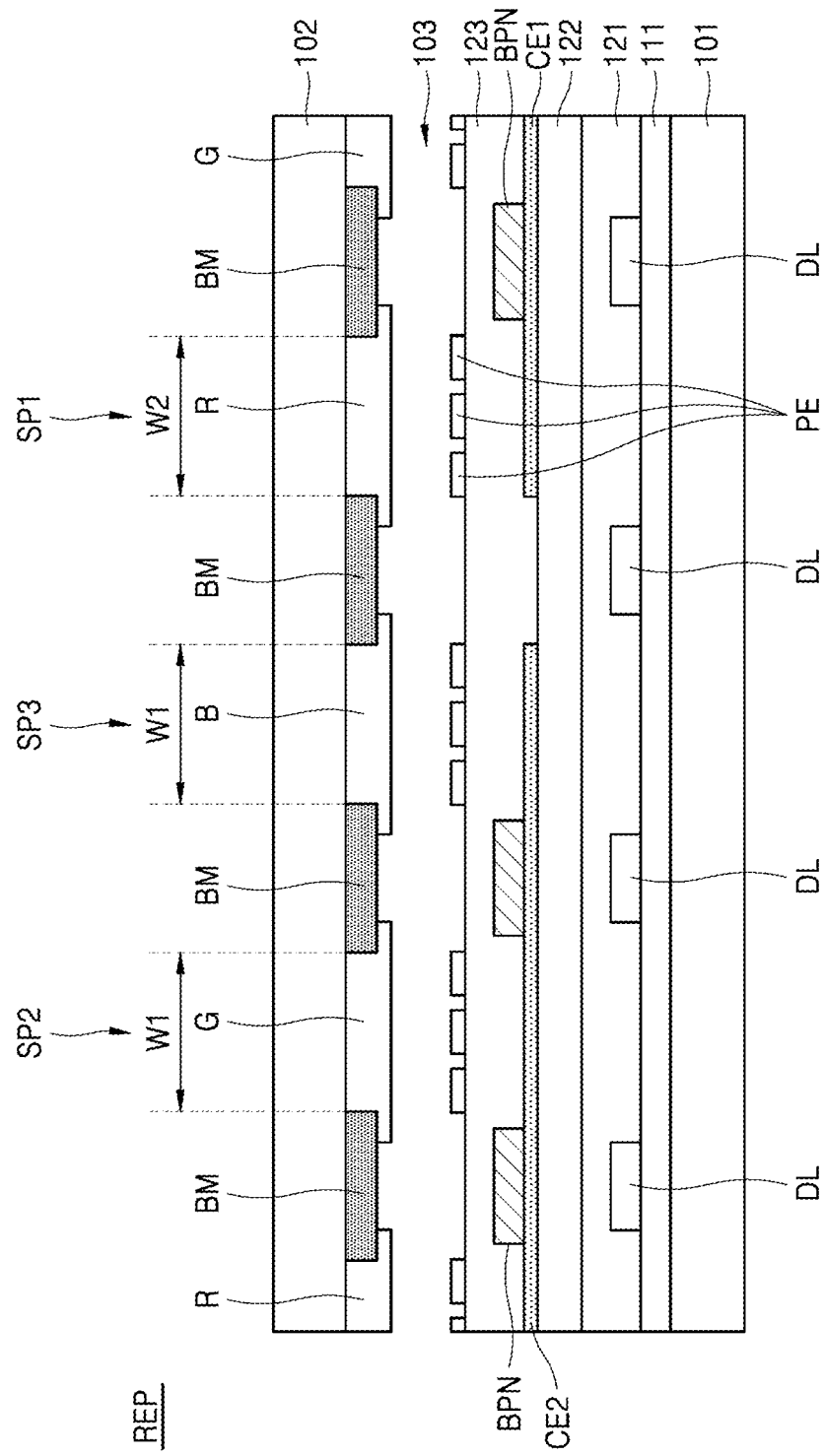

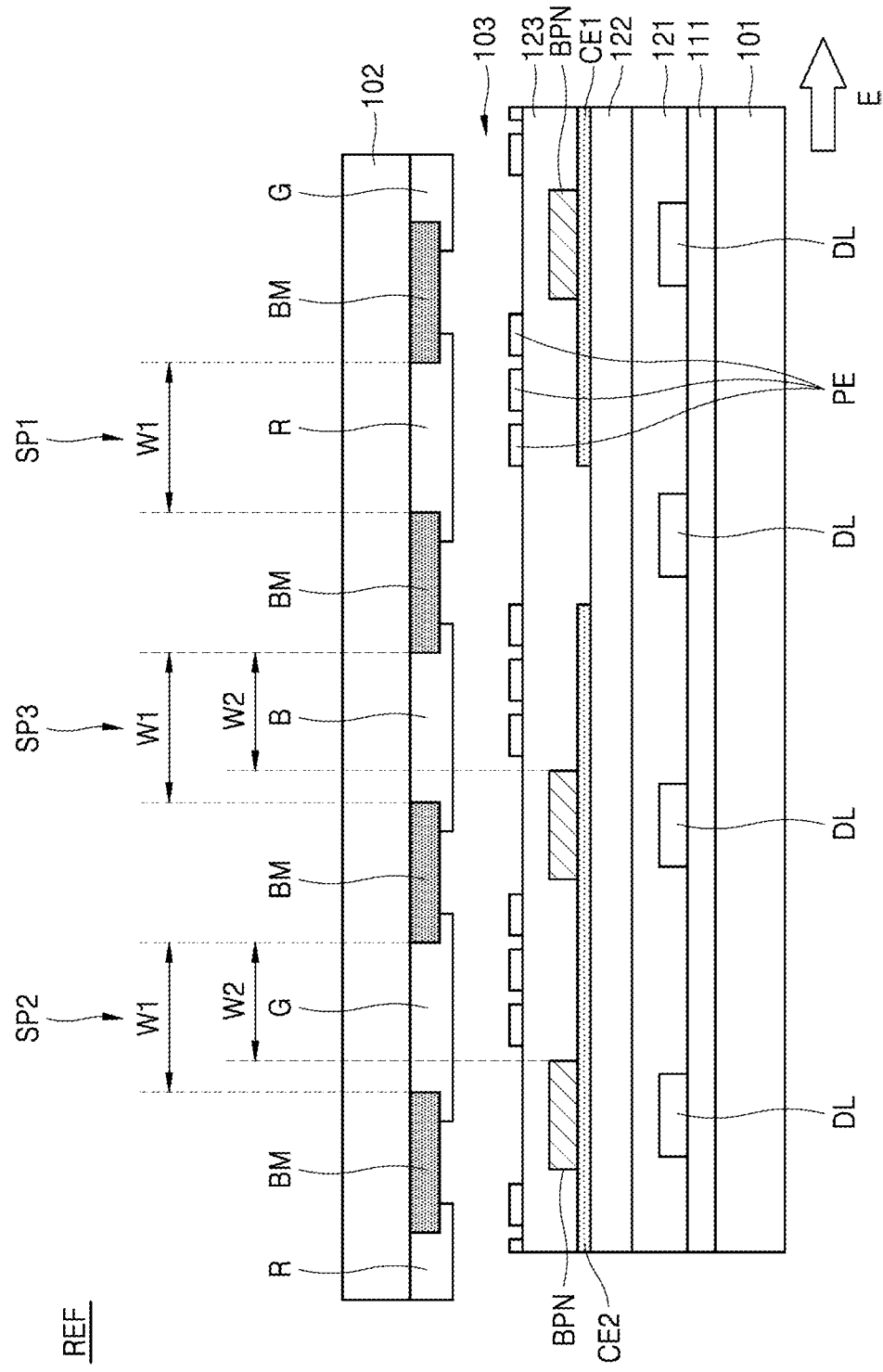

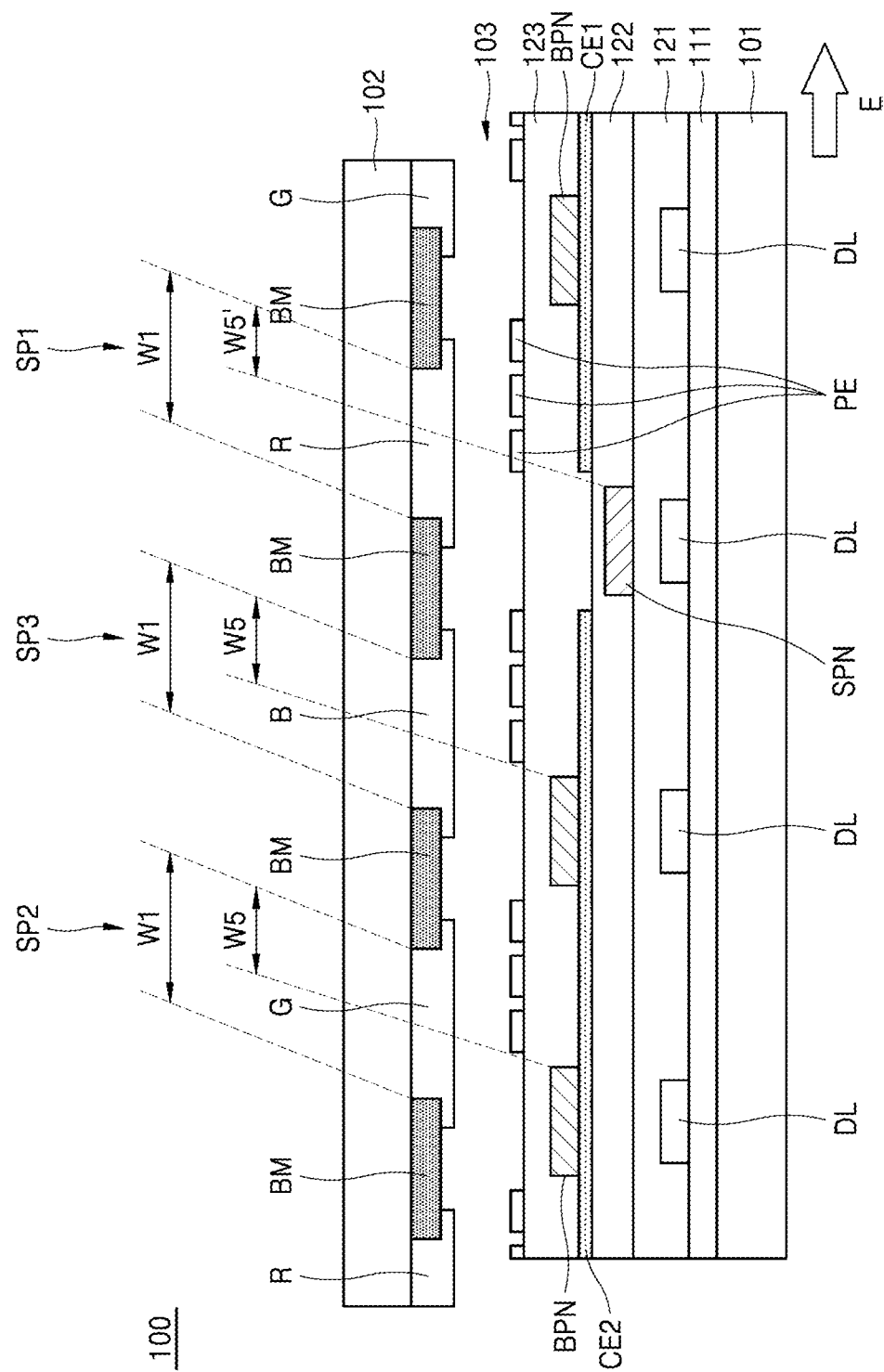

LIQUID CRYSTAL DISPLAY PANEL

CROSS-REFERENCE TO RELATED APPLICATION

This application claims the benefit of Korean Patent Application No. 10-2016-0158007, filed on Nov. 25, 2016 in the Korean Intellectual Property Office, the disclosure of which is incorporated herein by reference in its entirety.

BACKGROUND

Field of the Disclosure

The present disclosure relates to a display device, and more particularly, to a liquid crystal display panel capable of providing a touch sensing function.

Description of the Background

A display device has been applied to various electronic devices such as TVs, mobile phones, notebook computers and tablet computers. Thus, research has been continuously conducted on techniques for reducing the thickness, weight and power consumption of the display device.

Representative examples of the display device may include a liquid crystal display (LCD) device, a plasma display panel (PDP) device, a field emission display (FED) device, an electro luminescence display (ELD) device, an electro-wetting display (EWD) device and an organic light emitting display (OLED) device.

Such display devices have a display panel including a polarizing material or a light emitting material disposed between a pair of substrates bonded to each other.

For example, the LCD device includes an LCD panel, and the LCD panel includes a liquid crystal layer disposed between a pair of substrates bonded to each other and formed of a liquid crystal material to polarize light. Specifically, the liquid crystal panel generates a predetermined electric field between a common electrode and pixel electrodes corresponding to a plurality of pixel regions defined in a display region on which an image is displayed. At this time, while the electric field varies the angle at which the liquid crystal material of the liquid crystal layer is tilted, the light transmittances of the respective pixel regions may be adjusted to display an image.

Since the LCD device can be reduced in size and thickness while having low power consumption, the LCD device is used for various electronic devices such as notebook computers, monitors, automated devices and portable communication devices.

Recently, in order to improve users' convenience, LCD devices with a touch sensing function have been developed and commercialized. The touch sensing function refers to a function for sensing the position of a contact point of an object or a user's finger in a display region. The touch sensing function may be used as a unit for receiving a user's command.

For example, a method for embedding the touch sensing function in the LCD device includes an add-on method and an in-cell method. The add-on method is to attach a separate touch panel for the touch sensing function to a light emitting surface of the LCD panel, and the in-cell method is to share a part of components of the LCD panel as components for an image output function and a touch sensing function.

The add-on method has an advantage in that, since the separate touch panel is included, the image output function and the touch sensing function can be independently driven regardless of mutual influence. However, since the separate touch panel is added, the add-on method has a limitation in reducing the weight and thickness of the display device. Furthermore, since light emitted from the LCD panel is slightly lost by the touch panel, the display characteristic can be degraded.

On the other hand, since no separate touch panel is added in the in-cell method, the in-cell method has the advantage in reducing the weight and thickness of the display device, compared to the add-on method.

In the LCD panel with the touch sensing function based on the in-cell method, a common electrode corresponding to a plurality of pixel regions is modified to correspond to each touch block, and shared as an electrode for the image output function and the touch sensing function.

Since the common electrode serves to form an electric field in each of the pixel regions, the common electrode is disposed to cover the pixel region. Thus, in order to prevent an optical loss caused by the common electrode, the common electrode includes a transparent conductive material.

However, the transparent conductive material has relatively high resistance. Thus, when the common electrode is used, it is difficult to properly form capacitance for the touch sensing function. Therefore, the in-cell type LCD panel has a limitation in improving the reliability and accuracy of the touch sensing function.

SUMMARY

Accordingly, the present disclosure is directed to a liquid crystal display panel that substantially obviates one or more of problems due to limitations and disadvantages of the prior art.

Additional features and advantages of the disclosure will be set forth in the description which follows and in part will be apparent from the description, or may be learned by practice of the invention. Other advantages of the present disclosure will be realized and attained by the structure particularly pointed out in the written description and claims hereof as well as the appended drawings.

Various aspects of the present disclosure are directed to an LCD panel having a touch sensing function based on an in-cell method and capable of improving the accuracy and reliability of the touch sensing function.

In an aspect of the present disclosure, a liquid crystal display (LCD) panel may include: a plurality of unit pixels arranged in a matrix shape in a display region, and each including two or more sub pixels corresponding to different colors and arranged in parallel to each other; a gate line of a first direction and a data line of a second direction which intersect each other; a shield pattern disposed on a first interlayer dielectric layer covering the gate line and the data line, and overlapping the data line; a plurality of first common electrode patterns and second common electrode patterns arranged on a second interlayer dielectric layer covering the shield pattern; and a block pattern corresponding to each of the first and second common electrode patterns, disposed in a boundary region between two or more sub pixels included in each of the unit pixels, and overlapping at least one of the gate line and the data line.

In another aspect of the present disclosure, a liquid crystal display (LCD) panel comprising a plurality of unit pixels arranged in a matrix shape on a first substrate, each unit pixel comprising at least two sub pixels, a gate line and a data line intersect each other and defining a pixel region includes a first interlayer dielectric layer covering the data line and the gate line; a shield pattern on the first interlayer dielectric layer, disposed at a boundary region between the unit pixels and vertically overlapping the data line; first and second common electrode patterns, disposed at a region where an emission goes through and corresponding to at least two unit pixels adjacent to each other; a connection pattern on the first interlayer dielectric layer, corresponding to a spaced region between adjacent second common electrode patterns, and vertically overlapping the gate line; and a block pattern on each of the first and second common electrode patterns, disposed in a boundary region between at least two unit pixels, vertically overlapping at least one of the gate line and the data line, and separated from the shield pattern.

The shield pattern may be disposed between the first and second common electrode patterns adjacent to each other in the first direction, and disposed at a different from the block pattern, the first common electrode pattern and the second common electrode pattern. The shield pattern may be separated from the block pattern.

The first and second common electrode patterns may include a transparent conductive material, and the block pattern may include a metallic material.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the present disclosure and are incorporated in and constitute a part of the disclosure, illustrate aspects of the disclosure and together with the description serve to explain the principle of the present disclosure.

In the drawings:

FIG. 8A is a cross-sectional view of a comparative example of an LCD panel according to the related art;

FIGS. 8B, 8C and 8D illustrate a color difference for each view when a misalignment occurred in the comparative example of FIG. 8A; and FIGS. 9A and 9B illustrate a color difference for each view when a misalignment occurred in the LCD panel of FIG. 5.

DETAILED DESCRIPTION

Reference will now be made in detail to the aspects of the present disclosure, examples of which are illustrated in the accompanying drawings. Wherever possible, the same reference numbers will be used throughout the drawings to refer to the same or like parts.

First, an LCD device according to an aspect of the present disclosure will be described with reference to FIG. 1.

Figure 1:
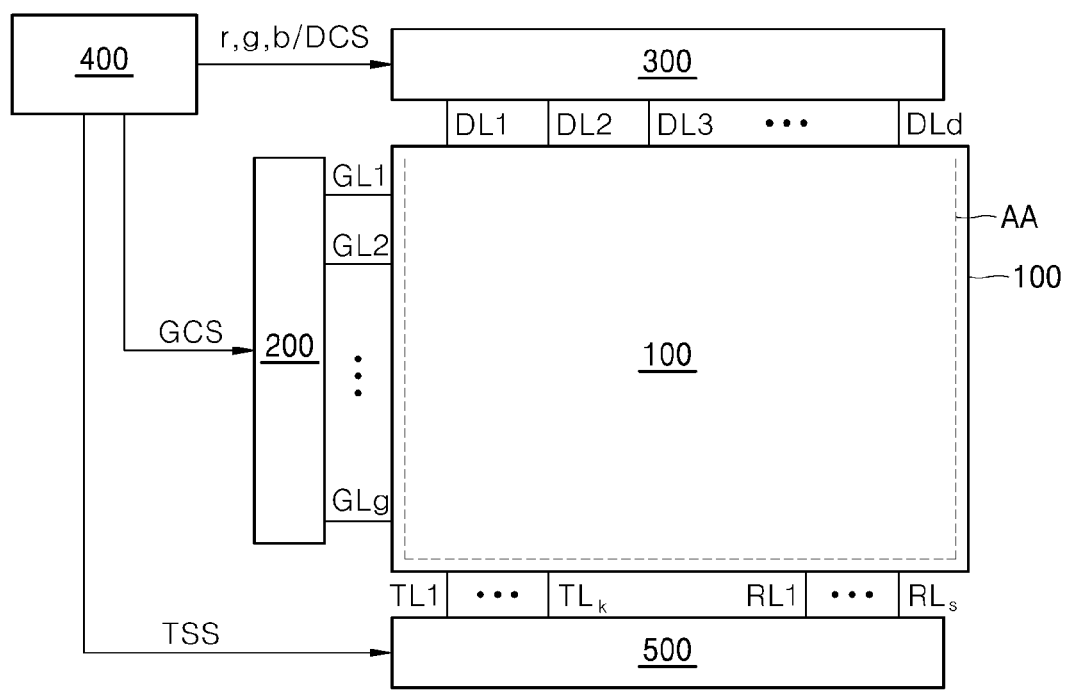
FIG. 1 illustrates an LCD device according to an aspect of the present disclosure.

FIG. 1 illustrates an LCD device according to an aspect of the present disclosure.

As illustrated in FIG. 1, the LCD device includes an LCD panel 100, a gate driving unit 200, a data driving unit 300, a timing controller 400 and a touch sensing unit 500. The LCD panel 100 includes gate lines GL1 to GLg extended in a first direction and data lines DL1 to DLd extended in a second direction, which intersect each other and define a plurality of pixel regions in a display region AA on which an image is displayed. The first direction indicates the side-to-side direction in FIG. 1, and the second direction indicates the top-to-bottom direction in FIG. 1. The gate driving unit 200 sequentially supplies gate signals to the respective gate lines GL1 to GLg during one vertical period for displaying one frame. The data driving unit 300 supplies data signals to the data lines DL1 to DLd during one horizontal period in which the gate signals are supplied to the respective gate lines GL1 to GLg. The timing controller 400 controls the gate driving unit 200 and the data driving unit 300. The touch sensing unit 500 drives a touch sensing function of the LCD panel 100.

The timing controller 400 generates control signals GCS and DCS for controlling operation timings of the gate driving unit 200 and the data driving unit 300, respectively, based on a timing signal such as a data enable (DE) signal or dot clock CLK which is inputted from an external system. The timing controller 400 re-sorts image data inputted from the external system, and outputs the re-sorted image data (r, g, b) to the data driving unit 300.

The gate control signal GCS generated by the timing controller 400 may include a gate start pulse GSP, a gate shift clock GSC, a gate output enable signal GOE and the like.

The data control signal DCS generated by the timing controller 400 may include a source start pulse SSP, a source shift clock SSC, a source output enable signal SOE and the like.

The timing controller 400 may further generate a touch control signal for controlling an operation timing of the touch sensing unit 500.

That is, the timing controller 400 may divide one vertical period into a plurality of image output periods and a plurality of touch sensing periods, and supply a touch synchronization signal TSS corresponding to a touch sensing period to the touch sensing unit 500.

The touch sensing unit 500 may drive transmission (Tx) touch lines TL1 to TLk in the first direction (i.e., X-axis direction) and reception (Rx) touch lines RL1 to RLs in the second direction (i.e., Y-axis direction), which are installed in the LCD panel 100.

For example, the touch sensing unit 500 may sequentially drive the plurality of Tx touch lines TL1 to TLk. The touch sensing unit 500 may drive the plurality of Rx touch lines RL1 to RLs while the respective Tx touch lines TL1 to TLk are driven. At this time, the touch sensing unit 500 may detect the Rx touch lines RL1 to RLs having a different voltage level from a threshold value. Thus, the touch sensing unit 500 may sense a point where a touch occurred, based on the driven Tx touch lines TL1 to TLk and the Rx touch lines RL1 to RLs having a different voltage level from the threshold value.

Next, the LCD panel according to the aspect of the present disclosure will be described with reference to FIGS. 2, 3, 4A, 4B and 5 to 7.

Figure 2:
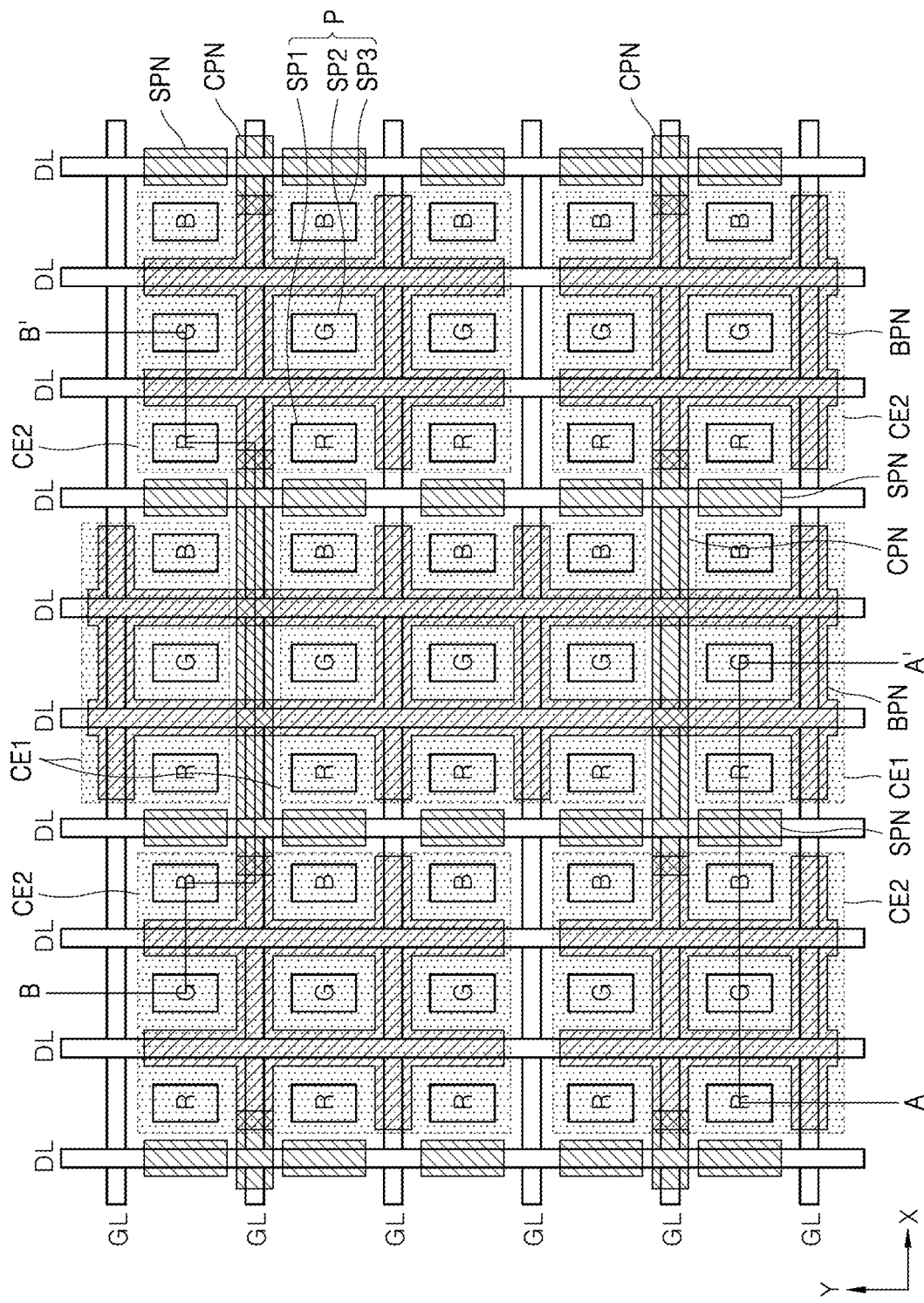
FIG. 2 illustrates an example of a portion of a display region of an LCD panel in FIG. 1.
Figure 3:
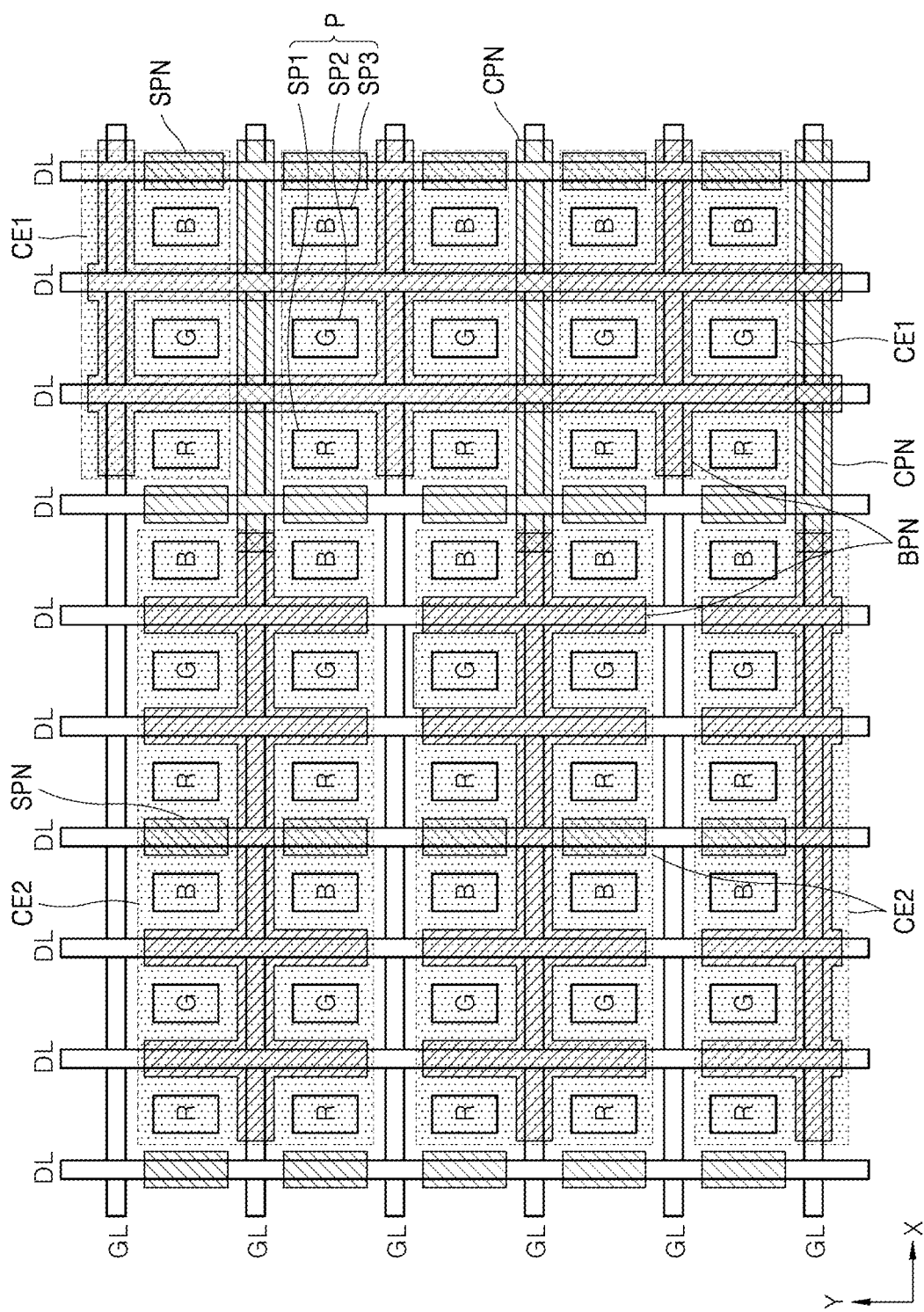
FIG. 3 illustrates another example of a portion of the display region of the LCD panel in FIG. 1.
Figure 4A:
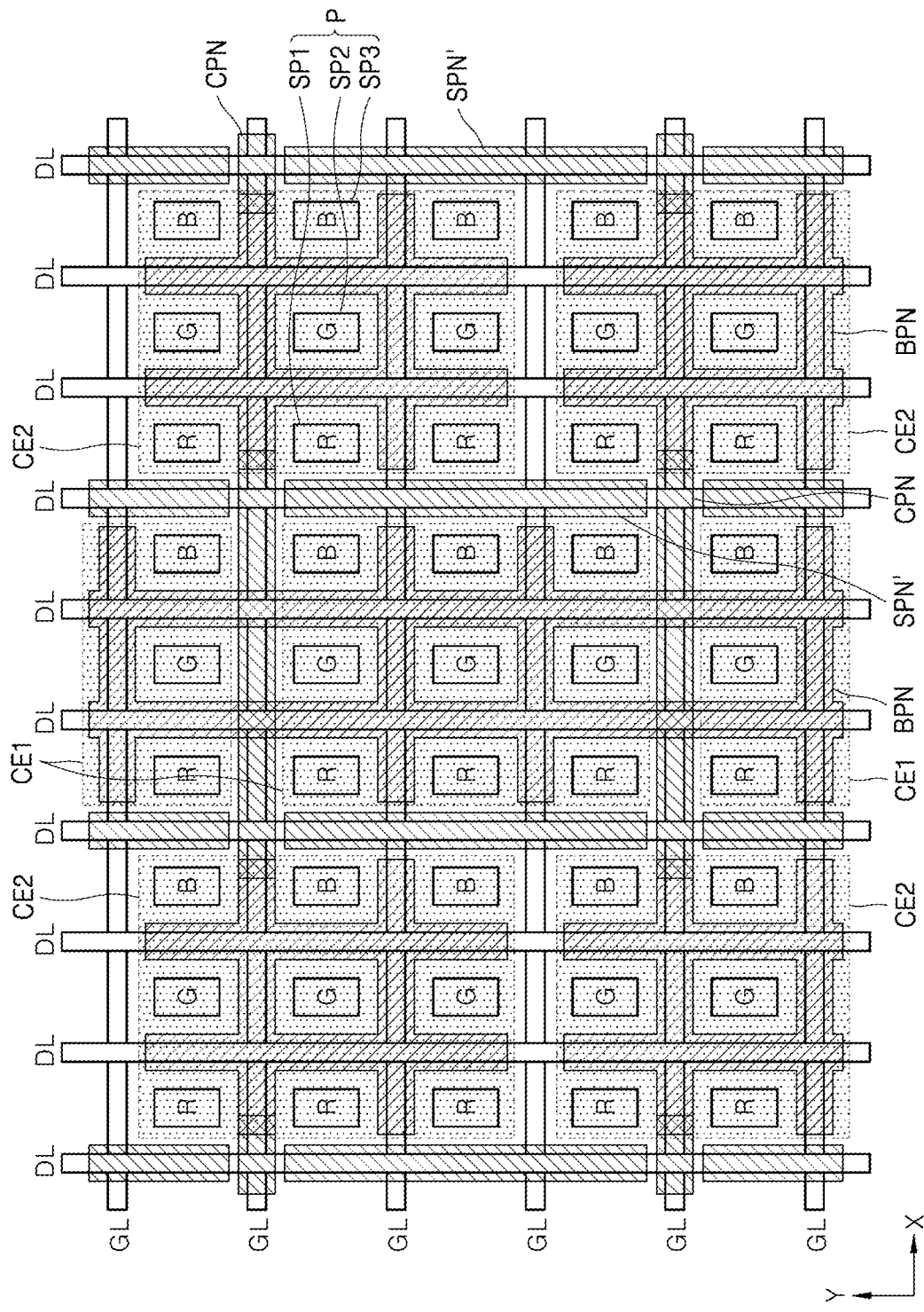
FIGS. 4A and 4B illustrate other examples of a portion of the display region of the LCD panel in FIG. 1.
Figure 4B:
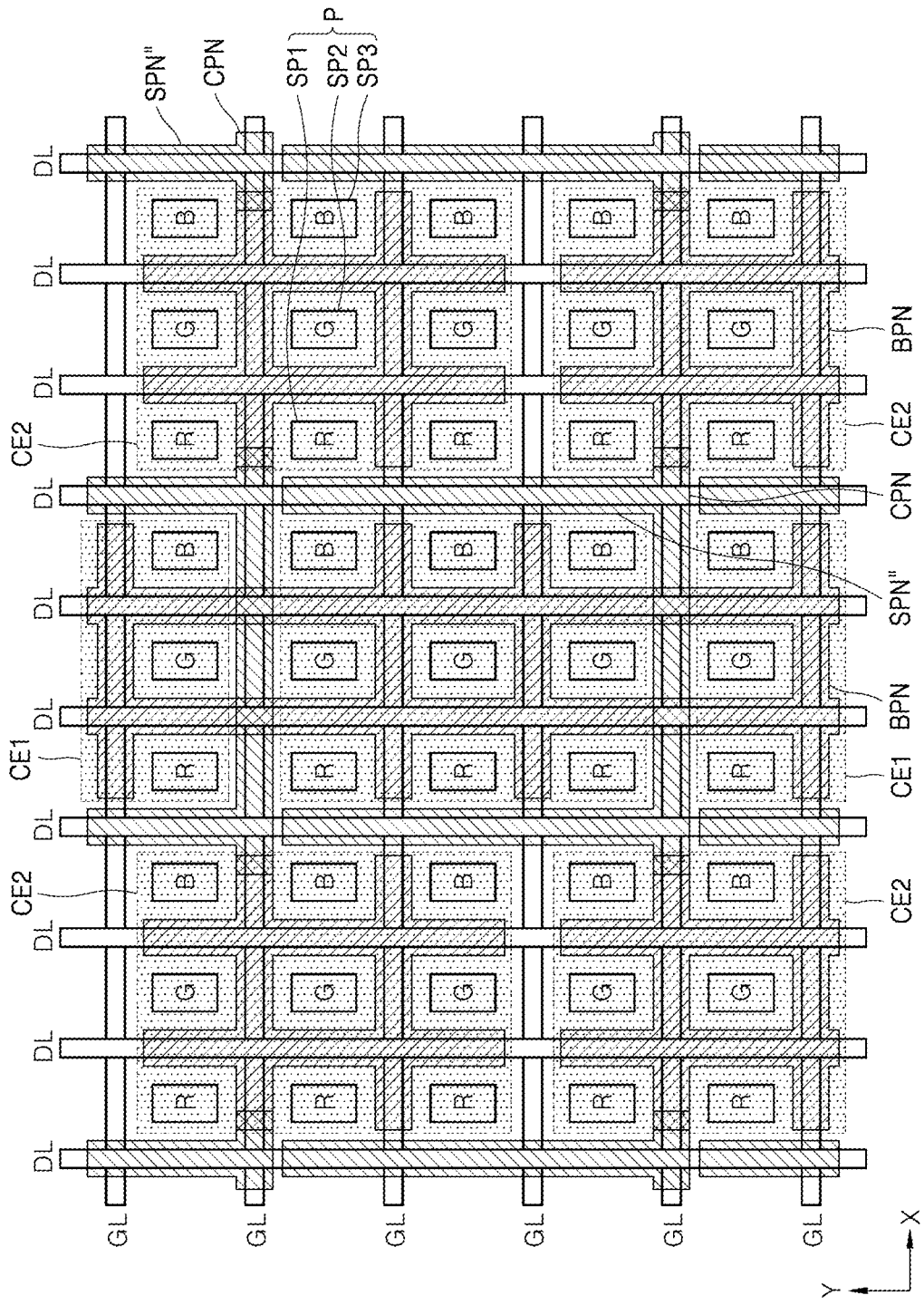
Figure 5:
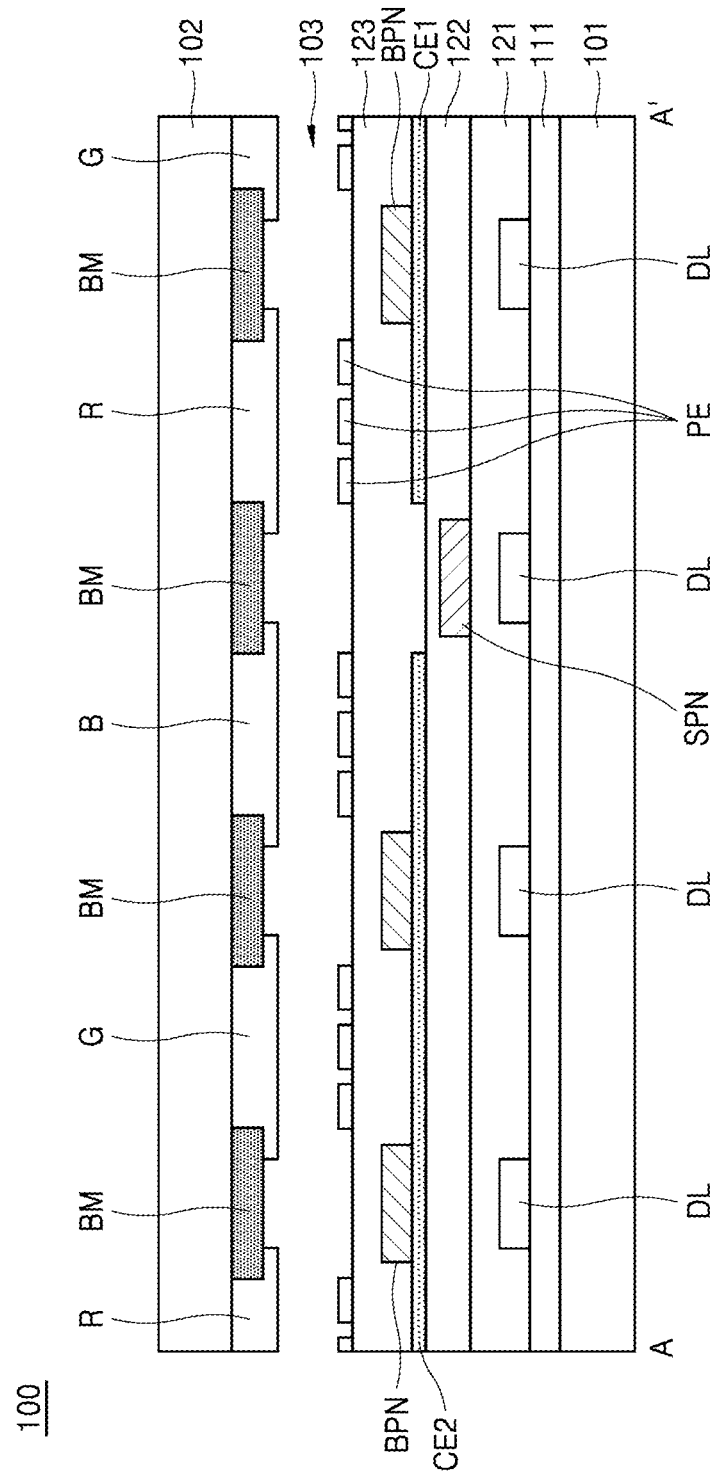
FIG. 5 is a cross-sectional view taken along line A-A' of FIG. 2.
Figure 6:
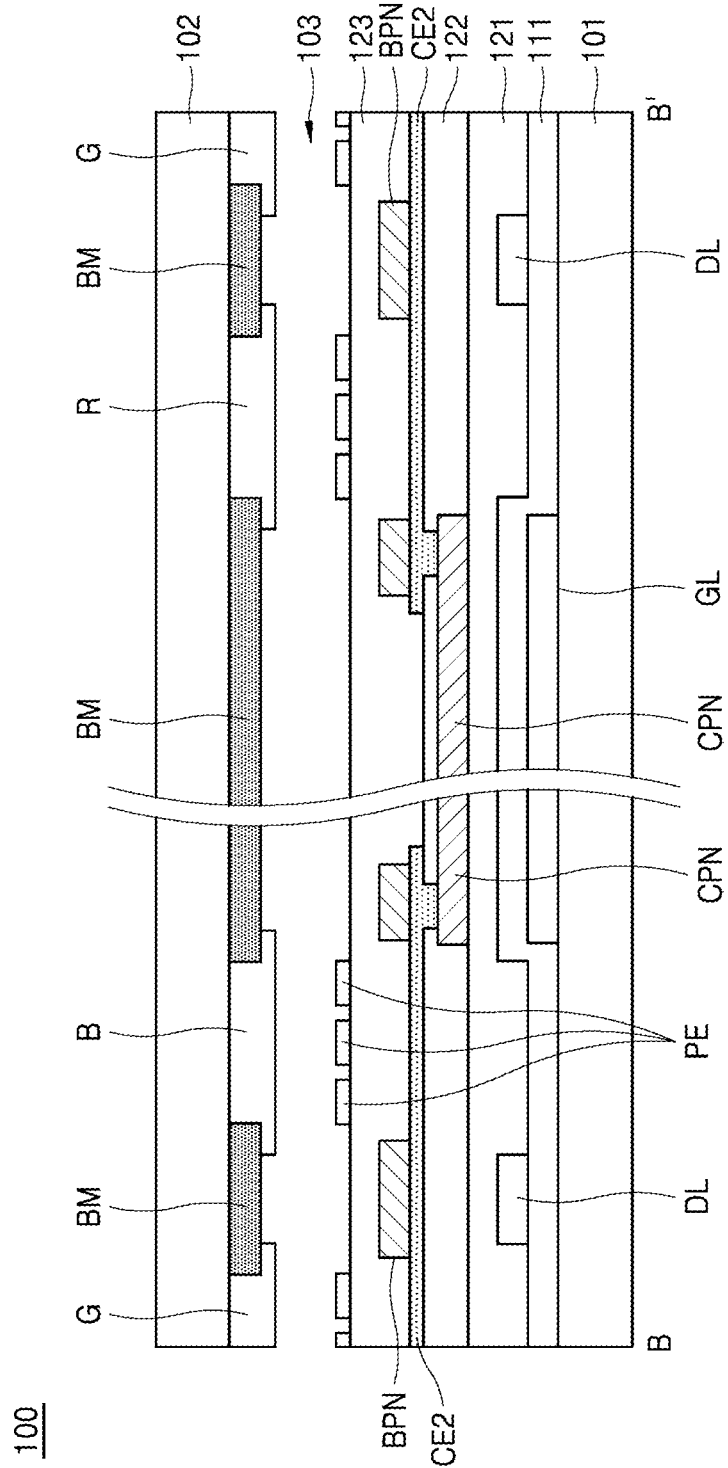
FIG. 6 is a cross-sectional view taken along line B-B' of FIG. 2.
Figure 7:
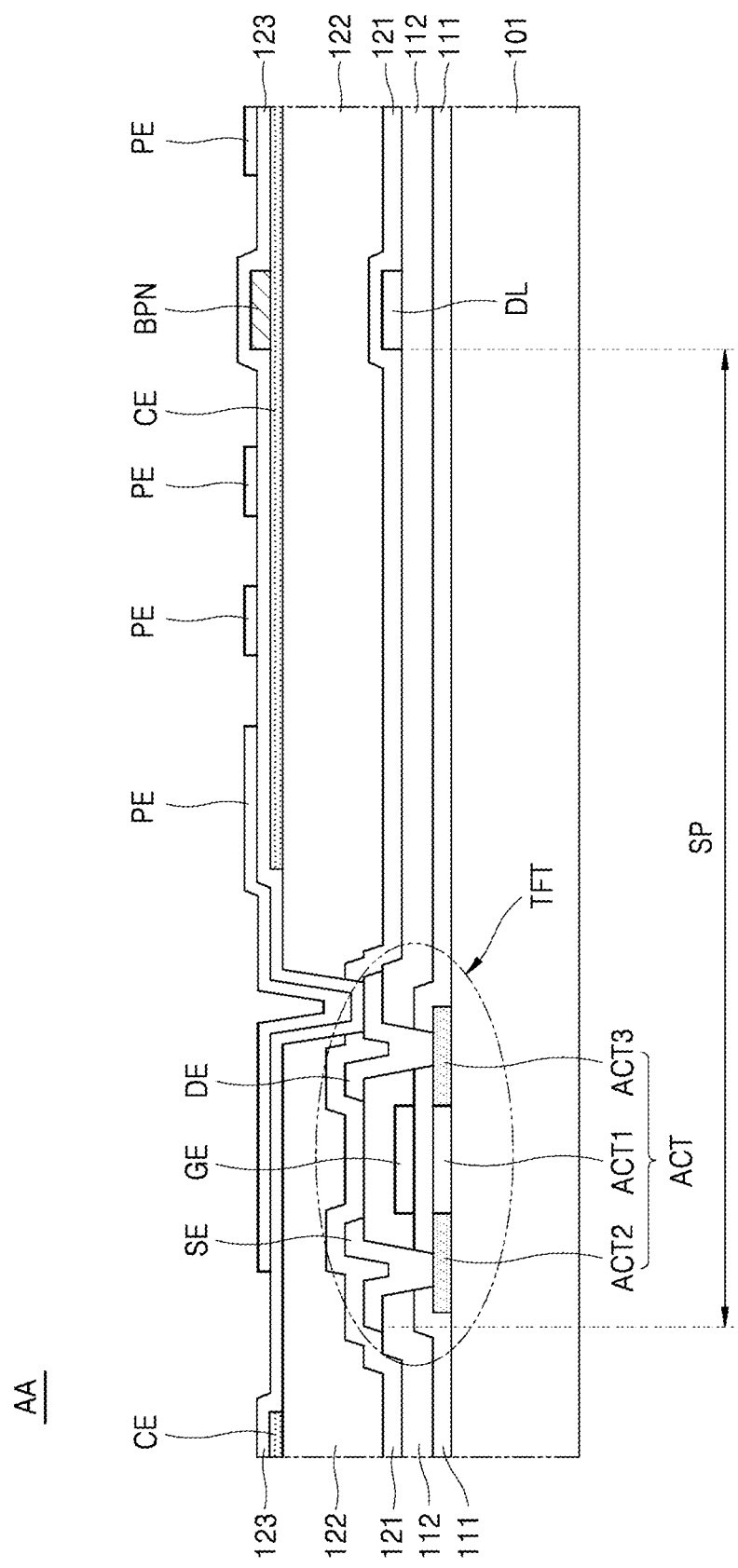
FIG. 7 is a cross-sectional view of one pixel region of the display region of FIG. 2.

FIG. 2 illustrates an example of a portion of the display region of the LCD panel in FIG. 1. FIG. 3 illustrates another example of a portion of the display region of the LCD panel in FIG. 1. FIGS. 4A and 4B illustrate other examples of a portion of the display region of the LCD panel in FIG. 1. FIG. 5 is a cross-sectional view taken along line A-A' of FIG. 2, and FIG. 6 is a cross-sectional view taken along line B-B' of FIG. 2. FIG. 7 is a cross-sectional view of one pixel region in the display region of FIG. 2.

As illustrated in FIG. 2, the LCD panel 100 according to the aspect of the present disclosure includes a plurality of unit pixels P arranged in a matrix shape in the display region AA of FIG. 1. Each of the unit pixels P includes two or more sub pixels SP1, SP2 and SP3 corresponding to different colors and arranged in parallel to each other.

For example, the unit pixels P may be arranged in parallel to each other in the first direction (X-axis direction or the side-to-side direction of FIG. 2), and include first to third sub pixels SP1 to SP3 corresponding to red (R), green (G) and blue (B).

The LCD panel 100 includes gate lines GL of the first direction and data lines DL of the second direction, which intersect each other and define pixel regions corresponding to the respective sub pixels SP1 to SP3 in the display region AA; a shield pattern SPN corresponding to the boundary region between the respective unit pixels P and overlapping the corresponding data line DL; a plurality of first and second common electrode patterns CE1 and CE2 each corresponding to two or more unit pixels P adjacent to each other; and a block pattern BPN corresponding to each of the first and second common electrode patterns CE1 and CE2, disposed at the boundary region between the two or more sub pixels SP1 to SP3 included in each of the unit pixels P, and overlapping at least one of the gate line GL and the data line DL. For reference, "the plurality of first and second common electrode patterns CE1 and CE2" may be hereafter referred to as common electrodes CE, for convenience of description.

The LCD panel 100 according to the aspect of the present disclosure further includes a connection pattern CPN corresponding to the spaced region between the respective second common electrode patterns CE2 and overlapping the corresponding gate line GL.

The block pattern BPN is disposed at the same layer as the first and second common electrode patterns CE1 and CE2. Therefore, in order to prevent a connection between the first and second common electrode patterns CE1 to CE2 adjacent in the first direction (X-axis) through the block pattern BPN, the block pattern BPN is not disposed between the first and second common electrode patterns CE1 and CE2 adjacent to each other.

Instead, the shield pattern SPN is disposed between the first and second common electrode patterns CE1 and CE2 adjacent to each other in the first direction (X-axis direction). The shield pattern SPN may have a length corresponding to one sub pixel SP1, SP2 or SP3.

In order to prevent a connection between the first and second common electrode patterns CE1 and CE2 adjacent to each other through the shield pattern SPN, the shield pattern SPN is disposed at a different layer from the first and second common electrode patterns CE1 and CE2.

As described later with reference to FIG. 5, the shield pattern SPN is disposed at a different layer from the block pattern BPN so as to be insulated from the block pattern BPN. Furthermore, the shield pattern SPN may not be connected to another line or pattern. In other words, the shield pattern SPN may be disposed in a floating state.

The plurality of first and second common electrode patterns CE1 and CE2 are arranged in a matrix shape in the display region AA. The plurality of first common electrode patterns CE1 are arranged in parallel to each other in the second direction (Y-axis direction), and the plurality of second common electrode patterns CE2 are arranged in parallel to each other in the second direction (Y-axis direction). Furthermore, the plurality of first and second common electrode patterns CE1 and CE2 are alternately arranged in the first direction (X-axis direction).

That is, when a second column includes the first common electrode patterns CE1 as illustrated in FIG. 2, first and third columns adjacent to the second column include the second common electrode patterns CE2.

Among the plurality of first common electrode patterns CE1, the first common electrode patterns CE1 adjacent to each other in the second direction (Y-axis direction) are connected to each other through the block pattern BPN. For this structure, the block pattern BPN disposed on each of the first common electrode pattern CE1 is extended to overlap the data line DL, and connected to the block pattern adjacent in the second direction.

Among the plurality of second common electrode patterns CE2, the second common electrode patterns CE2 adjacent to each other in the first direction (X-axis direction) with the first common electrode pattern CE1 interposed therebetween are connected to each other through a connection pattern CPN and the block pattern BPN. For this structure, at least one side of the connection pattern CPN is extended to overlap the block pattern BPN adjacent to the connection pattern CPN in the first direction. The connection pattern CPN is connected to the adjacent block pattern BPN through a contact hole formed through a dielectric layer 122 (FIG. 5) between the connection pattern CPN and the block pattern BPN.

As such, the plurality of first common electrode patterns CE1 connected in the second direction (Y-axis direction) through the block pattern BPN are used as the Rx touch lines RL1 to RLs of FIG. 1 during the touch sensing period. The plurality of second common electrode patterns CE2 connected in the first direction (X-axis direction) through the connection pattern CPN are used as the Tx touch lines TL1 to TLk during the touch sensing period.

That is, the plurality of first and second common electrode patterns CE1 and CE2 are retained at a common voltage during the image output period, and used as common electrodes for generating an electric field with the pixel electrodes of the sub pixels SP1 to SP3. The plurality of first and second common electrode patterns CE1 and CE2 are used as the plurality of Rx touch lines RL1 to RLs and the plurality of Tx touch lines TL1 to TLk during the touch sensing period.

The block pattern BPN serves to lower the resistance of each of the first and second common electrode patterns CE1 and CE2, and is disposed on each of the first and second common electrode patterns CE1 and CE2. That is, the plurality of the first and second common electrode patterns CE1 and CE2 include a transparent conductive material so as to be disposed in the region from which light is emitted. Since the transparent conductive material has a relatively high resistance, the plurality of first and second common electrodes patterns CE1 and CE need to be connected to the block pattern BPN including a material having a lower resistance than the transparent conductive material, in order to lower the resistances of the first and second common electrode patterns CE1 and CE2. For example, the block pattern BPN may include a metallic material such as aluminum and copper.

The connection pattern CPN for connecting the plurality of second common electrode patterns CE2 in the first direction may be disposed at the same layer as the shield pattern SPN. In this case, the connection pattern CPN may be disposed in a floating state like the shield pattern SPN. As illustrated in FIG. 2, the connection pattern CPN may be separated from the shield patterns SPN.

The block pattern BPN covers at least one of the gate line GL and the data line DL which overlap the plurality of first and second common electrode patterns CE1 and CE2.

For example, as illustrated in FIG. 2, each of the first and second common electrode patterns CE1 and CE2 may correspond to three unit pixels P adjacent in the second direction. In this case, the block pattern BPN corresponding to one of the first and second common electrode patterns CE1 and CE2 may overlap the corresponding common electrode pattern CE1 or CE2, and have a shape of "#" to cover two gate lines GL and two data lines DL.

However, this is only an example, and the shape of the block pattern BPN may cover two or more data lines DL or one or more gate lines GL in the region corresponding to each of the common electrode patterns CE1 and CE2. As long as the block pattern BPN does not intrude into the pixel region, any shapes may be applied.

As the first and second common electrode patterns CE1 and CE2 are connected to at least one of the block pattern BPN and the connection pattern CPN, the first and second common electrode patterns CE1 and CE2 may have lower resistance. Thus, since the structure is more suitable for forming capacitance for the touch sensing function, the reliability and accuracy of the touch sensing function can be improved.

As illustrated in FIG. 2, each of the unit pixels P may include the first to third sub pixels SP1 to SP3 arranged in parallel to each other in the first direction (X-axis direction).

In this case, the boundary region between the respective unit pixels P corresponds to the boundary region between the third sub pixel SP3 and the first sub pixel SP1 which are arranged in parallel to the first direction (X-axis direction). That is, the shield pattern SPN overlaps the data line DL disposed between the third sub pixel SP3 and the first sub pixel SP1 which are arranged in parallel to each other in the first direction (X-axis direction).

The block pattern BPN overlaps the data lines DL disposed in the spaced region between the first and second sub pixels SP1 and SP2 and the spaced region between the second and third sub pixels SP2 and SP3, respectively. Furthermore, the block pattern BPN may further overlap the gate line GL disposed in the spaced region between the unit pixels P adjacent in the second direction (Y-axis) in each of the common electrode patterns CE1 and CE2.

For example, the first to third sub pixels SP1 to SP3 included in each of the unit pixels P may correspond to red (R), green (G) and blue (B).

Referring to FIG. 2, each of the first and second common electrode patterns CE1 and CE2 corresponds to three unit pixels P adjacent in the second direction. In another aspect, however, the number of unit pixels corresponding to each of the first and second common electrode patterns CE1 and CE2 may be set to various values.

That is, as illustrated in FIG. 3, each of the first and second common electrode patterns CE1 and CE2 may correspond to two unit pixels P adjacent to each other in the first direction (X-axis direction) and two unit pixels P adjacent to each other in the second direction (Y-axis direction) and adjacent to the unit pixels P adjacent to each other in the first direction. In other words, each of the common electrode patterns CE1 and CE2 may correspond to four unit pixels P arranged in 2×2.

Even in this case, the shield pattern SPN is disposed in the region overlapping the gate line GL between the respective unit pixels P.

Referring to FIGS. 2 and 3, the shield pattern SPN is disposed between the third sub pixel SP3 and the first sub pixel SP1 corresponding to the region between the first and second common electrode patterns CE1 and CE2, and has a length corresponding to one pixel region. In another aspect, however, the shield pattern SPN may be modified into a shape different from the shape illustrated in FIG. 2.

That is, as illustrated in FIG. 4A, a shield pattern SPN' may have a length corresponding to the edge of the first common electrode pattern CE1. That is, the shield pattern SPN' may be disposed in parallel to at least one side of the first common electrode pattern CE1. In this case, since the number of shield patterns SPN' is reduced, a patterning process for forming the shield patterns SPN' can be simplified.

Alternatively, as illustrated in FIG. 4B, a shield pattern SPN" may be connected to any one connection pattern CPN adjacent in the second direction (Y-axis direction). In this case, the resistance of the second common electrode pattern CE2 connected to the connection pattern CPN can be further reduced.

As such, the shield patterns SPN, SPN' and SPN" may be modified into any patterns, as long as they overlap the data line DL disposed between the unit pixels P corresponding to the region between the first and second common electrode patterns CE1 an CE2 adjacent to each other in the first direction (X-axis direction) and not connected to two or more connection patterns CPN.

As illustrated in FIG. 5, the LCD panel 100 according to the aspect of the present disclosure further includes first and second substrates 101 and 102 facing each other, a liquid crystal layer 103 disposed between the first and second substrates 101 and 102, a black matrix and color filters R, G and B disposed on the second substrate 102, and a pixel electrode corresponding to each of the pixel regions.

As illustrated in FIG. 6, the gate line GL may be disposed on the first substrate 101, and covered by a gate dielectric layer 111.

The data line DL may be disposed on the gate dielectric layer 111. That is, the gate dielectric layer 111 is disposed between the gate line GL and the data line DL, and insulates the gate line GL and the data line DL from each other in the direction where the gate line GL and the data line DL intersect each other.

However, this is only an example, and the layers at which the gate line GL and the data line DL are disposed may be changed, depending on the structure of a thin film transistor TFT. That is, referring to FIG. 7, the gate line GL may be disposed on the gate dielectric layer 111 with a gate electrode GE of the thin film transistor TFT, and the data line DL may be disposed on a source-drain dielectric layer 112 with a source electrode SE and a drain electrode DE of the thin film transistor TFT.

The LCD panel 100 further includes a first interlayer dielectric layer 121 to cover the gate line GL and the data line DL.

The shield pattern SPN is disposed on the first interlayer dielectric layer 121 (shown in FIG. 5).

As illustrated in FIG. 6, the connection pattern CPN is further disposed on the first interlayer dielectric layer 121.

The shield pattern SPN and the connection pattern CPN are covered by the second interlayer dielectric layer 122.

The plurality of first and second common electrode patterns CE1 and CE2 are disposed on the second interlayer dielectric layer 122. At this time, the second common electrode pattern CE2 is connected to the connection pattern CPN through a contact hole passing through the second interlayer dielectric layer 122.

That is, the connection pattern CPN is used as a bridge for connecting the second common electrode pattern CE2 adjacent in the first direction, while bypassing the first common electrode pattern CE1.

Then, as illustrated in FIG. 5, the block pattern BPN is disposed on each of the first and second common electrode patterns CE1 and CE2.

As described above, the block pattern BPN disposed on each of the first common electrode patterns CE1 is extended while overlapping the data line DL, and connected to another block pattern BPN adjacent in the second direction (Y-axis direction). Therefore, among the plurality of first common electrode patterns CE1, the first common electrode patterns CE1 adjacent to each other in the second direction (Y-axis direction) are connected to each other through the extended block pattern BPN.

The block pattern BPN disposed on each of the second common electrode patterns CE2 is separated from another adjacent block pattern BPN and not connected to the adjacent block pattern BPN. That is, the block pattern BPN on each of the second common electrode patterns CE2 is separated from another adjacent block pattern BPN, such that the second common electrode pattern CE2 is prevented from being connected to another second common electrode pattern CE2 adjacent to the second direction (Y-axis direction) and prevented from being connected to the first common electrode pattern CE1 adjacent in the first direction (X-axis direction).

The plurality of first and second common electrode patterns CE1 and CE2 and the block pattern BPN may be covered by a third interlayer dielectric layer 123.

Furthermore, the pixel electrode PE is disposed at a different layer from the plurality of first and second common electrode patterns CE1 and CE2.

For example, the pixel electrode PE may be disposed on the first interlayer dielectric layer 121 with the shield pattern SPN and the connection pattern CPN. That is, the shield pattern SPN or the connection pattern CPN may be disposed at the edge of the pixel region on the first interlayer dielectric layer 121, and the pixel electrode PE may be disposed in the pixel region.

As illustrated in FIGS. 5 and 6, the pixel electrode PE may be disposed on the third interlayer dielectric layer 123.

Furthermore, the black matrix BM and the color filters R, G and B may be disposed on the second substrate 102 facing the first substrate 101.

The black matrix BM corresponds to the edge of each pixel region. The black matrix BM has a larger width than at least the shield pattern SPN and the block pattern BPN, and is disposed to cover at least the shield pattern SPN and the block pattern BPN.

The color filters R, G and B correspond to each of the pixel regions. Through the color filters R, G and G, the first to third sub pixels SP1 to SP3 included in each of the unit pixels P may correspond to red, green and blue.

The liquid crystal layer 103 may be formed of a liquid crystal material injected between the first and second substrates 101 and 102. At this time, although not illustrated in detail in FIGS. 5 and 6, an alignment layer (not illustrated) for setting the initial tilt direction of the liquid crystal material may be disposed in at least one of the first and second substrates 101 and 102. For example, the alignment layer may be disposed on the third interlayer dielectric layer 123 of the first substrate 101. Alternatively, the alignment layer may be disposed on an overcoat layer covering the black matrix BM and the color filters R, G and G of the second substrate 102.

The LCD panel 100 according to the present aspect further includes a thin film transistor (not illustrated) corresponding to each of the sub pixels SP1 to SP3, in order to independently drive the sub pixels SP1 to SP3.

As illustrated in FIG. 7, the thin film transistor TFT corresponding to each pixel region SP may include an active layer ACT, a gate electrode GE, a source electrode SE and a drain electrode DE. The active layer ACT is disposed on the first substrate 101 and includes a channel region ACT1 and source and drain regions ACT2 and ACT3 at both sides of the channel region ACT1. The gate electrode GE is disposed on the gate dielectric layer 111 covering the active layer ACT, and overlaps the channel region ACT1. The source electrode SE is disposed on the source-drain dielectric layer 112 covering the gate electrode GE and connected to the source region ACT2. The drain electrode DE is disposed on the source-drain dielectric layer 112 and connected to the drain region ACT3.

The thin film transistor TFT and the data line DL are covered by the first interlayer dielectric layer 121.

When the pixel electrode PE is disposed on the third interlayer dielectric layer 123, the pixel electrode PE is connected to the thin film transistor TFT through a contact hole formed through the first to third interlayer dielectric layers 121 to 123.

As such, the LCD panel 100 according to the present aspect includes the first and second common electrode patterns CE1 and CE2 each corresponding to two or more unit pixels P and the block pattern BPN corresponding to each of the first and second common electrode patterns CE1 and CE2 and disposed in the boundary region between two or more sub pixels SP1, SP2 and SP3 included in each of the unit pixels P. Thus, since the resistances of the first and second common electrode patterns CE1 and CE2 can be lowered, the accuracy and reliability of the touch sensing function can be improved.

Furthermore, since the first and second common electrode patterns CE1 and CE2 adjacent in the first direction can be connected to each other by the block pattern BPN disposed at the same layer as the first and second common electrode patterns CE1 and CE2, the block pattern BPN is not disposed between the first and second common electrode patterns CE1 and CE2. Furthermore, since each of the first and second common electrode patterns CE1 and CE2 corresponds to two or more unit pixels P, the block pattern BPN cannot be disposed in a part of the boundary regions between the respective unit pixels P.

If the block pattern BPN is disposed at the boundary region between the unit pixels P in each of the first and second common electrode patterns CE1 and CE2, the portion where the block pattern BPN is disposed may be recognized differently from the portion where the block pattern BPN is not disposed. In order to prevent such a problem, no block patterns BPN may be disposed in the entire boundary regions between the respective unit pixels P, regardless of whether each of the boundary regions is the boundary region between the first and second common electrode patterns CE1 and CE2.

Instead, the shield pattern SPN is disposed in the boundary region between the unit pixels P. The shield pattern SPN can prevent a reduction in reliability of color expression which may be caused by a misalignment between the pair of substrates 101 and 102. Specifically, when a misalignment occurred between the first and second substrates 101 and 102 while no block patterns BPN are disposed in all of the boundary regions between the respective unit pixels P, the opening widths of the sub pixels SP1 to SP3 may be changed depending on whether the block pattern BPN is present. Then, the color expression may be degraded.

According to the present aspect, however, the LCD device may further include the shield pattern SPN which is disposed at a different layer from the first and second common electrode patterns CE1 and CE2 and the block pattern BPN and corresponds to the boundary region between the unit pixels P, thereby preventing a reduction in reliability of color expression which may be caused by a misalignment.

That is, as the shield pattern SPN is disposed in the boundary region between the unit pixels P in which the block pattern BPN cannot be disposed, the opening width can be reduced by the shield pattern SPN as much as the opening width which is reduced by the block pattern BPN when a misalignment occurs. Therefore, since the opening widths of the respective sub pixels SP1 to SP3 become equal or similar to each other, degradation in color expression by the influence of the misalignment can be prevented, depending on the view.

This will be described in more detail with reference to FIGS. 8A to 8D and 9A and 9B.

Figure 8B:
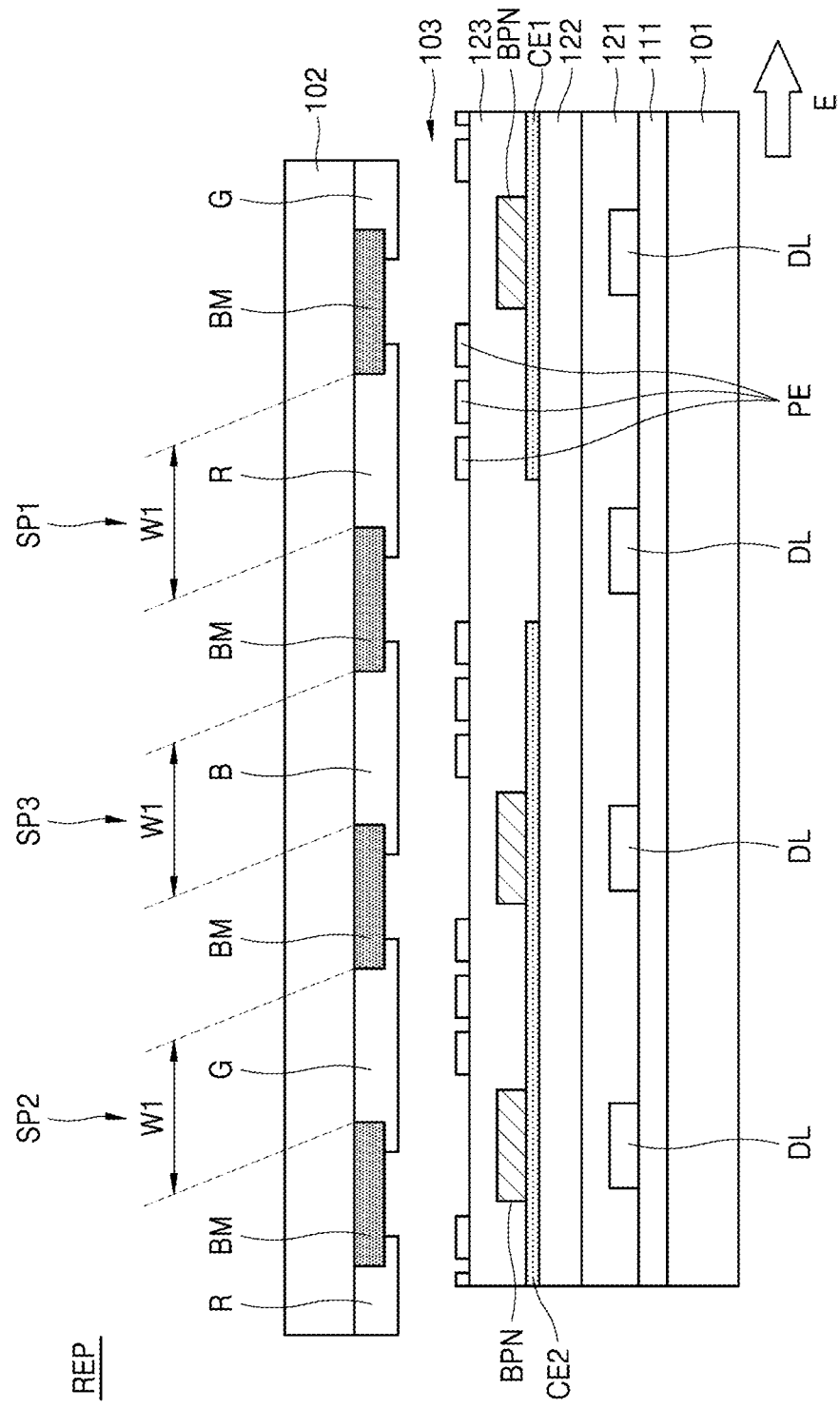
Figure 8D:
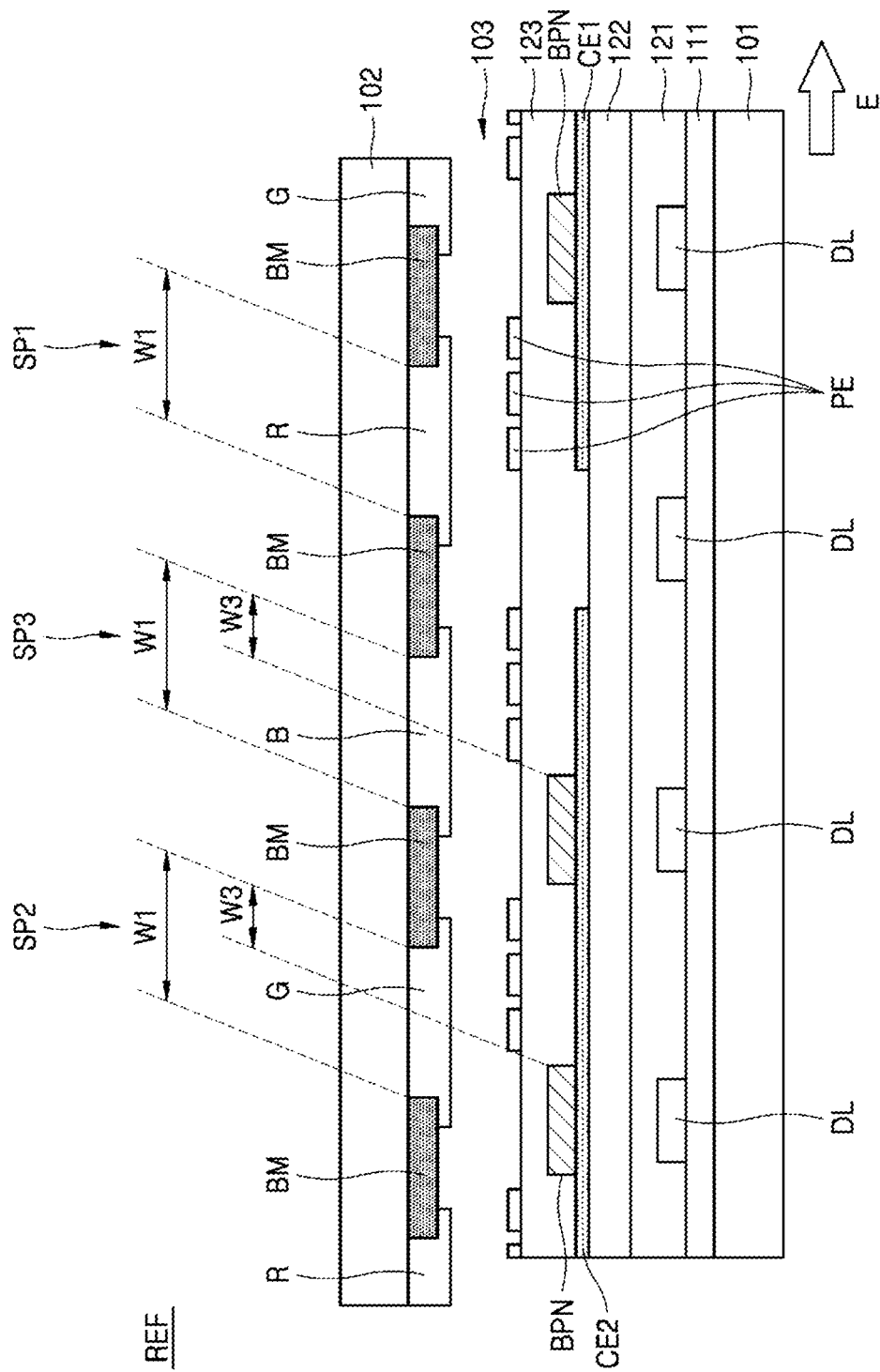
Figure 9A:
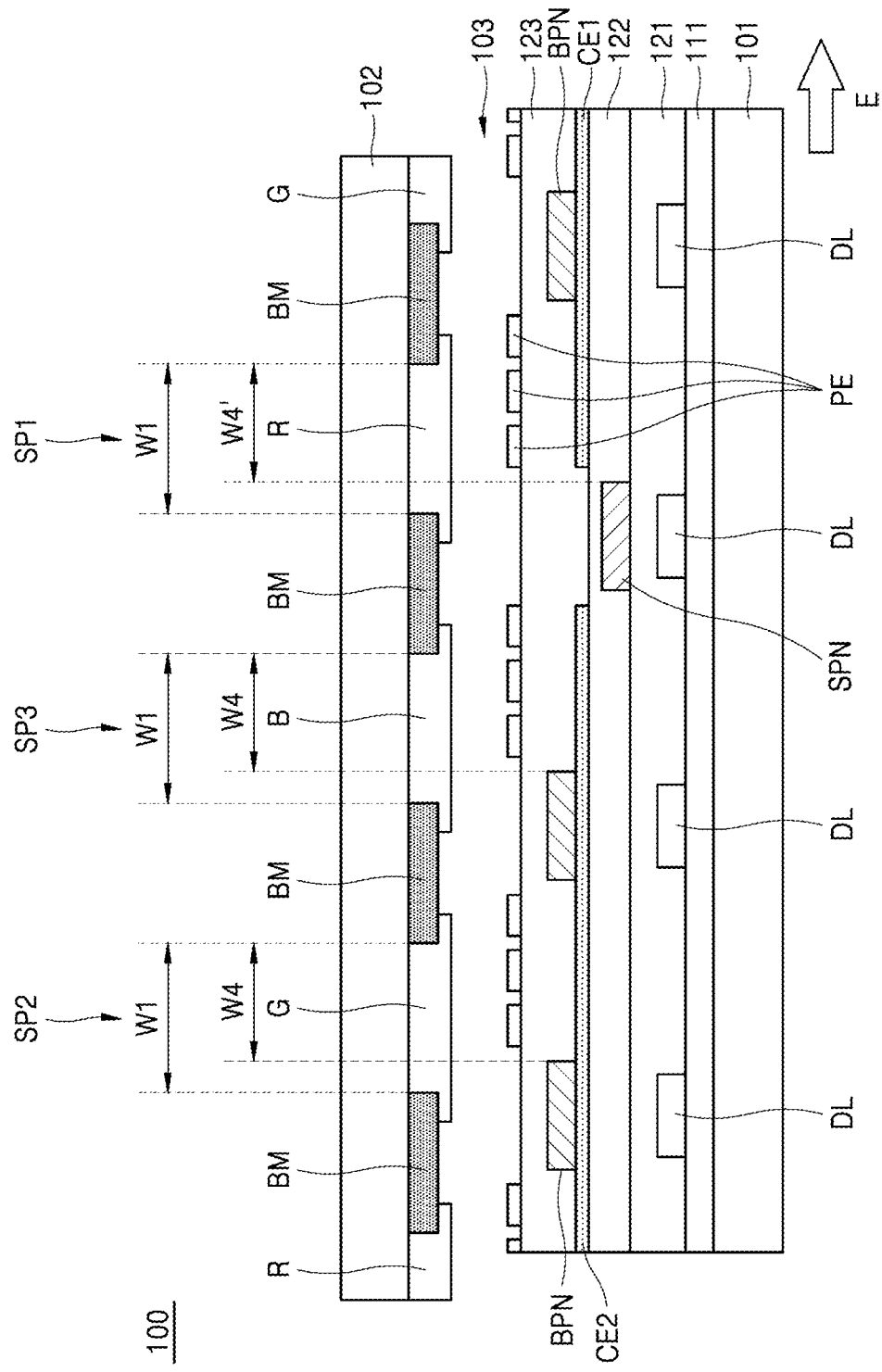

FIG. 8A is a cross-sectional view of a comparative example of an LCD panel according to the related art, and FIGS. 8B, 8C and 8D illustrate a color difference for each view when a misalignment occurred in the comparative example of FIG. 8A. FIGS. 9A and 9B illustrate a color difference for each view when a misalignment occurred in the LCD panel of FIG. 5.

The comparative example REF illustrated in FIGS. 8A to 8D illustrates the structure in which the shield pattern SPN of FIG. 5 is not included. Furthermore, FIGS. 8B to 8D illustrate that a misalignment occurred because the first substrate was pushed by a predetermined error E from the second substrate 102.

As illustrated in FIG. 8A, the comparative example REF does not include the shield pattern SPN. However, when no misalignments occurred, the sub pixels SP1 to SP3 emit light at an opening width W1 corresponding to the black matrix BM.

Furthermore, when a misalignment occurred as illustrated in FIG. 8B, it is observed that each of the sub pixels SP1 to SP3 emits light at an opening width W1 corresponding to the black matrix BM, from a user's view corresponding to the direction in which the second substrate 102 is misaligned from the first substrate 101 at the front of the display surface through which the LCD panel REF emits light (the left region of the front of the panel in FIG. 8B).

That is, the second substrate 102 may be misaligned to the left side from the first substrate 101. In this case, the same image quality as the LCD panel REF in which a misalignment did not occur may be observed from the left view with respect to the front of the LCD panel REF. On the other hand, sub pixels emitting light at a smaller opening width than those of the LCD panel REF in which no misalignments occur are observed from the front view of the liquid crystal panel REF and the right view with respect to the front of the liquid crystal panel REF.

Specifically, as illustrated in FIG. 8C, the opening widths of the sub pixels are changed depending on the block pattern BPN, from a user's view corresponding to the front of the LCD panel REF (the region facing the front of the LCD panel in FIG. 8C). That is, the second and third sub pixels SP2 and SP3 having the block pattern BPN disposed in the boundary region among the two or more sub pixels SP1 to SP3 emit light at an opening width W2 which is reduced as much as the block pattern BPN protrudes to the outside of the black matrix BM. On the other hand, since the first sub pixel SP1 has no block pattern BPN protruding to the outside of the black matrix BM, the first sub pixel SP1 emits light at an opening width SW corresponding to the black matrix BM.

Furthermore, as illustrated in FIG. 8D, it is also observed that the opening widths of the sub pixels are changed depending on whether the block pattern BPN is present, from a user's view corresponding to the opposite direction of the direction in which the second substrate 102 is misaligned from the first substrate 101 at the front of the LCD panel REF. That is, while the second and third sub pixels SP2 and SP3 emit light at an opening width W3 reduced as much as the block pattern BPN protrudes to the outside of the black matrix BM, the first sub pixel SP1 emits light at the opening width W1 corresponding to the black matrix BM.

Thus, when a misalignment occurred, the amount of light emitted from the first sub pixel SP1 may become larger than the amount of light emitted from the second or third sub pixel SP2 or SP3, depending on a user's view. At this time, the color is biased toward the color of the light emitted from the first sub pixel SP1. That is, the misalignment may have an influence on the uniformity and reliability of the color expression.

As illustrated in FIGS. 9A and 9B, however, the shield pattern SPN is disposed in the boundary region between the unit pixels P, where the block pattern BPN cannot be disposed. Therefore, although a misalignment occurs, a change in color expression from the user's view can be prevented depending on whether the block pattern BPN is present, thereby preventing degradation in uniformity and reliability of the color expression.

FIGS. 9A and 9B illustrate that a misalignment occurred because the first substrate 101 was pushed by a predetermined error E from the second substrate 102.

As illustrated in FIGS. 9A and 9B, even when a misalignment occurred, it is observed that the opening widths of all the sub pixels are similar to each other, from most views regardless of the front of the LCD panel 100 and the left and right sides of the front of the LCD panel 100.

That is, as illustrated in FIG. 9A, it is observed that the second and third sub pixels SP2 and SP3 having the block pattern BPN disposed in the boundary region therebetween among the two or more sub pixels SP1 to SP3 emit light at an opening width W4 reduced as much as the block pattern BPN protrudes to the outside of the black matrix BM, from a user's view corresponding to the front side of the LCD panel 100 (the region facing the front of the panel in FIG. 9A). Furthermore, the first sub pixel SP1 has no block pattern BPN protruding to the outside of the black matrix BM, but emits light at an opening width W4' which is reduced as much as the shield pattern SPN protrudes to the outside of the black matrix BM.

Furthermore, as illustrated in FIG. 9B, it is observed that the second and third sub pixels SP2 and SP3 emit light at an opening width W5 reduced as much as the block pattern BPN protrudes to the outside of the black matrix BM, and the first sub pixel SP1 emits light at an opening width W5' reduced as much as the shield pattern SPN protrudes to the outside of the black matrix BM, from a user's view corresponding to the opposite direction of the direction in which the second substrate 102 is misaligned from the first substrate 101 at the front of the LCD panel 100 (the right region of the front of the panel in FIG. 9B).

Therefore, although a misalignment occurs to such an extent that the block pattern BPN protrudes to the outside of the black matrix BM, each of the sub pixels SP1 to SP3 emits light at an opening width corresponding to the black matrix and any one of the block pattern BPN and the shield pattern SPN. Therefore, a color variation is prevented depending on a user's view when a misalignment occurred.

According to the aspects of the present disclosure, the LCD panel may include the plurality of first and second common electrode patterns and the block pattern disposed at the boundary region between two or more sub pixels included in each of the unit pixels corresponding to each of the first and second common electrode patterns. Thus, the LCD panel can lower the resistances of the first and second common electrode patterns while having the touch sensing function based on the in-cell method.

Furthermore, in order to prevent a connection between the first and second common electrode patterns, the block pattern may not be disposed between the first and second common electrode patterns. Instead, as the shield pattern at a different layer from the block pattern is disposed at the boundary between the first and second common electrode patterns, it is possible to prevent a reduction in color expression, which may be caused by a misalignment between the pair of substrates.

It will be apparent to those skilled in the art that various modifications and variations can be made in the liquid crystal display panel of the present disclosure without departing from the spirit or scope of the aspects. Thus, it is intended that the present disclosure covers the modifications and variations of the aspects provided they come within the scope of the appended claims and their equivalents.

What is claimed is:

1. A liquid crystal display (LCD) panel comprising:
a first substrate including a plurality of unit pixels arranged in a matrix shape in a display region, wherein each of a plurality of unit pixels includes at least two sub pixels;
a gate line arranged in a first direction and a data line arranged in a second direction crossing the first direction on first substrate, wherein each of the sub pixels is defined by the gate line and the data line;
a first interlayer dielectric layer covering the gate line and the data line;
a shield pattern on the first interlayer dielectric layer;
a second interlayer dielectric layer covering the shield pattern;
a plurality of first and second common electrode patterns disposed on the second interlayer dielectric layer and corresponding to at least two unit pixels adjacent to each other; and
a block pattern on each of the first and second common electrode patterns, disposed in a boundary region between the sub pixels and overlapping at least one of the gate line and the data line,
wherein the first common electrode patterns and the second common electrode patterns are alternately arranged in the first direction, the first common electrode patterns are arranged in the second direction,
the second common electrode patterns are arranged in the second direction, and
the shield pattern overlaps a data line which is disposed between the first and second common electrode patterns which are adjacent to each other in the first direction, and
wherein the shield pattern is disposed under a gap between the first and second common electrode patterns and is not electrically connected to other lines or patterns.

2. The LCD panel of claim 1, wherein the shield pattern is disposed on a different layer from each of the block patterns, the first common electrode patterns and the second common electrode patterns.

3. The LCD panel of claim 2, wherein the shield pattern is separated from the block pattern.

4. The LCD panel of claim 1, wherein the first and second common electrode patterns include a transparent conductive material.

5. The LCD panel of claim 1, wherein the block pattern includes a metallic material.

6. The LCD panel of claim 1, wherein the block pattern disposed on each of the first common electrode patterns is extended to overlap the data line, connected to adjacent block pattern in the second direction, and being in contact with the first common electrode pattern, and the first common electrode patterns adjacent to each other in the second direction among the plurality of first common electrode patterns are connected to each other through the block pattern.

7. The LCD panel of claim 1, further comprising a connection pattern disposed on the first interlayer dielectric layer, corresponding to a spaced region between the second common electrode patterns, connected to the block pattern disposed on each of the second common electrode patterns through a contact hole passing through the second interlayer dielectric layer, and overlapping the gate line, wherein the second common electrode patterns adjacent to each other in the first direction with the first common electrode pattern interposed therebetween are connected to each other through the connection pattern.

8. The LCD panel of claim 7, wherein the shield pattern is connected to the connection pattern.

9. The LCD panel of claim 1, wherein the shield pattern is disposed in a floating state.

10. The LCD panel of claim 1, wherein each of the shield pattern and the block pattern has a width greater than that of the gate line and the data line.

11. The LCD panel of claim 10, wherein the shield pattern and the block pattern have the same width.

12. The LCD panel of claim 1, further comprising a black matrix disposed on a second substrate facing the first substrate, the black matrix corresponding to the edge of each pixel region,
wherein the black matrix overlaps the shield pattern and the block pattern, and has a larger width than the shield pattern and the block pattern.

13. The LCD panel of claim 12, further comprising a color filter disposed on the second substrate and corresponding to each of the pixel regions; and
a liquid crystal layer disposed between the first and second substrates.

14. The LCD panel of claim 13, further comprising a gate dielectric layer disposed between the gate line and the data line;

a third interlayer dielectric layer covering the first and second common electrode patterns and the block pattern; and a pixel electrode disposed on the third interlayer dielectric layer and corresponding to each of the pixel regions.

15. A liquid crystal display (LCD) panel comprising a plurality of unit pixels arranged in a matrix shape on a first substrate, each unit pixel comprising at least two sub pixels, a gate line and a data line intersect each other and defining a pixel region, comprising:

a first interlayer dielectric layer covering the data line and the gate line;

a shield pattern on the first interlayer dielectric layer;

a connection pattern on the first interlayer dielectric layer;

first and second common electrode patterns disposed on a second interlayer dielectric layer covering the shield pattern and the connection pattern, and corresponding to at least two unit pixels adjacent to each other; and a block pattern on each of the first and second common electrode patterns, disposed in a boundary region between the sub pixels overlapping at least one of the gate line and the data line, and separated from the shield pattern, wherein the first common electrode patterns and the second common electrode patterns are alternately arranged in the first direction, the first common electrode patterns are arranged in the second direction, the second common electrode patterns are arranged in the second direction, the shield pattern overlaps a data line which is disposed between the first and second common electrode patterns which are adjacent to each other in the first direction, and the connection pattern overlaps a gate line which corresponds to a spaced region between adjacent second common electrode patterns, and wherein the shield pattern is disposed under a gap between the first and second common electrode patterns and is not electrically connected to other lines or patterns.

16. The LCD panel of claim 15, wherein the connection pattern is connected to the block pattern through a contact hole through the second interlayer dielectric layer between the connection pattern and the block pattern.

17. The LCD panel of claim 15, wherein the block pattern serves to lower a resistance of each of the first and second common electrode patterns.

18. The LCD panel of claim 17, wherein the plurality of first and second common electrode patterns is connected to the block pattern.

* * * * *